Jan. 4, 1927. E. V. CROWELL Re. 16,516

APPARATUS FOR AND METHOD OF CEMENTING OIL WELL CASINGS

Original Filed June 15, 1920

INVENTOR
Erd V. Crowell
BY Westall and Wallace
ATTORNEY

Reissued Jan. 4, 1927.

Re. 16,516

UNITED STATES PATENT OFFICE.

ERD V. CROWELL, OF LOS ANGELES, CALIFORNIA.

APPARATUS FOR AND METHOD OF CEMENTING OIL-WELL CASINGS.

Original No. 1,502,179, dated July 22, 1924, Serial No. 389,151, filed June 15, 1920. Application for reissue filed June 29, 1926. Serial No. 119.486.

My invention relates to improvements in well casings, particularly those of the type employed in oil and gas wells, and it consists in the constructions, combinations and arrangements herein described and claimed.

One of the objects of the invention is to provide a cementing shoe for use in connection with an oil or gas well casing, by means of which a cementing mixture, as for example mud-fluid, can be ejected from the casing string or "oil string" to fill the space between the string and well bore and thus seal the formation seat against the seepage of water.

Another object of this invention is to provide a device which is adapted to be placed any place in a string of casing, as a coupling member between adjacent joints of casing or as a true section of the string.

A further object of the invention is to provide means in oil or gas well constructions, enabling the making of a water-tight seal between the casing and rock formation independently of the casing shoe on the lowermost extremity of the "oil string" or the texture of the landing formation on which the shoe rests.

A further and important object of the invention is to provide a valve mechanism forming part of the well casing, through which the mud-fluid is ejected behind the casing.

A further object of the invention is to provide a construction by means of which the cementing material may be introduced around the casing while the latter rests on its formation seat before the oil or gas sand has been opened, the entire casing being employed in carrying out this mode of operation.

Another object of the invention is to adopt a method of carrying out the foregoing objects.

Figure 1:
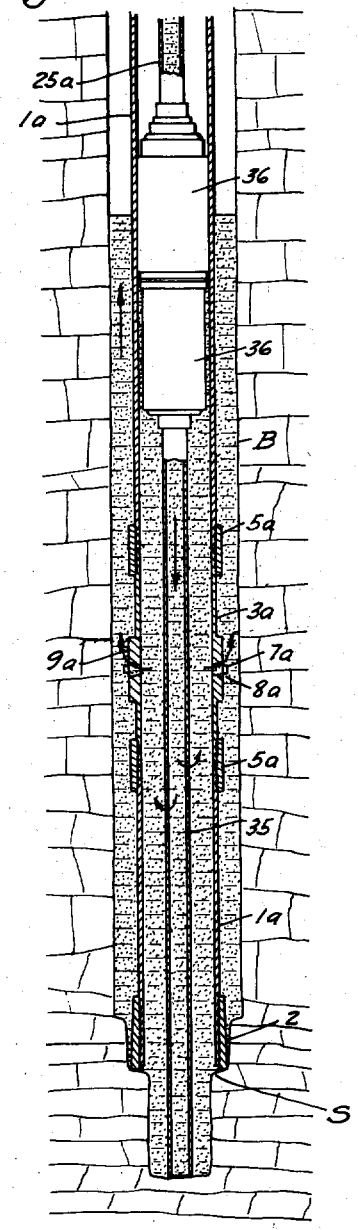
Figure 2:
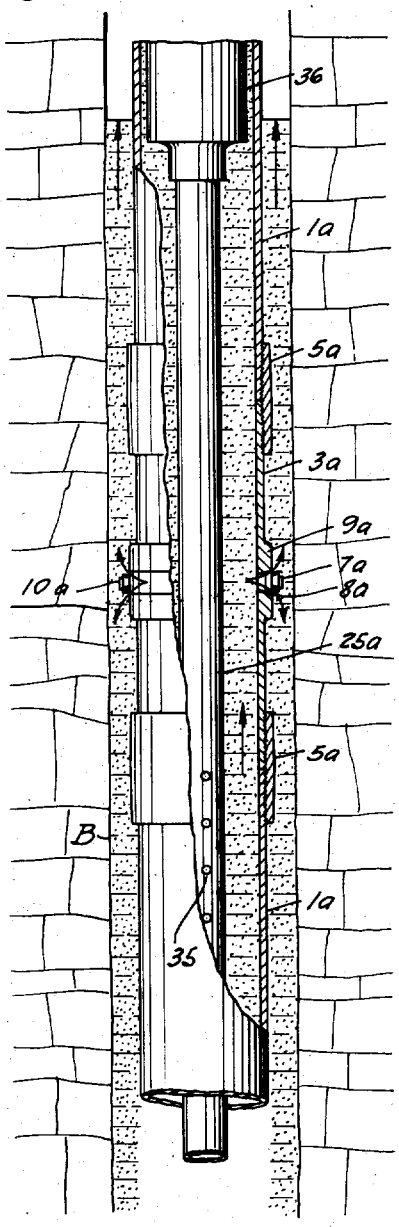

Other objects of my invention will appear in the following specification reference being had to the accompanying drawings, in which:

Fig. 1 is a longitudinal section illustrating the improved cementing apparatus wherein the whole casing is employed in discharging the cementing material, and Fig. 2 is a detail section of the same structure.

This application is principally concerned with that form of the invention wherein the entire casing is employed during the operation of discharging the cementing material, another apparatus for the same purpose being disclosed in my Patent No. 1,432,017, October 17, 1922, which is a division of this application.

In order that the reader might be able to more fully appreciate the purpose of the invention, it is thought well to preface the description of the construction and mode of operation by a brief description of oil well casing operation. Casing, as now used in oil field operations is either iron or steel tubular pipe, the kinds and sizes thereof differing considerably in various fields, all according to the peculiar conditions encountered.

A complete column of pipe or casing as placed in the bore of oil wells, is commonly referred to as the "string" of casing. The fundamental purpose of the oil well casing is that of protection, that is to say, to keep the water and other foreign substances from falling into the shot hole at the bottom and thereby either crowding the oil back from the bore or obstructing the lower end of the bore in such a manner that neither oil nor gas can flow.

In drilling oil or gas wells, the formations passed through as the depth increases consist of alternating layers of lime-stone, shale, and occasionarlly a stratum of sand. The shale layers predominate over the lime layers as regards number and thickness, and again, the lime layers predominate over the sand layers in the same manner. Usually the underground water finds its channels of flow in the lime or sand strata, the water flowing through the sand stratum generally above or below a lime stratum.

As the depth of the hole is increased during the drilling operation, water producing lime or sand strata are encountered, the water thus released by the puncturing of the strata by the drill point, settling in the hole and filling it with water. The drilling operations are thus greatly retarded, due to the cushioning effect the water has on the drilling operation of the tools.

Again, the water released from the lime strata washes down over the shale strata below, causing the shale to cave, slough out and fall down the hole. A loose shale formation may thus cave to such an extent as to even entirely bury the tools. An enormous amount of additional work is required in thereafter excavating the material and recovering the tools.

With this brief survey in mind, the need for the improvement which the invention offers will be understood. The invention relates to a construction by which the sealing of a casing in a bore may be performed before the oil or gas stratum has been opened. The "oil string" comprises several casing sections $1^a$, which occupy a substantially central position in the well bore B, the casing shoe 2 at the lowermost extremity resting on an annular projection of rock or other material, commonly known as the formation seat S. The bore of the well is ultimately intended to communicate with what is known as the shot hole (not shown) but according to the invention the bore is cemented before such communication is established.

Carried by the casing $1^a$ is the cementing shoe $3^a$ which is secured to adjacent sections by couplings $5^a$. The cementing shoe $3^a$ is very much like one of the sections of the well casing. Two or more valves $7^a$ normally close ports $8^a$ in the annular enlargement $9^a$ of the shoe $3^a$, each being held in place by rather powerful leaf springs suggested at $10^a$ and clearly shown in my patent referred to.

A section of tubing $25^a$ is let down through the casing $1^a$ until the lower end strikes the bottom of the bore B. This tubing has a belt of perforations 35 out of which fluid flows into the casing $1^a$ in accordance with the arrow, completely filling the inside of the casing and escaping through the ports $8^a$ into the space between the casing and the wall of the bore. Any ordinary type of tubing packer is used to secure a tight joint between the tubing $25^a$ and the casing $1^a$, two of such packers 36 being shown, however, only the upper rubber having been expanded into engagement with the casing.

The method of operation may readily be understood from the foregoing description. The casing $1^a$ is let down into the bore until the shoe engages and rests upon the formation S. The cementing shoe $3^a$ is introduced in the casing $1^a$ at the desired location from the bottom, the mud fluid outlet valve $7^a$ being normally held closed by the leaf springs mentioned. The tubing $25^a$ with its packer mechanisms 36 is lowered into the casing until it strikes the closed bottom of the bore.

Mud fluid or other cementing material is then introduced into the tubing $25^a$ whence it escapes at the perforations 35. The casing $1^a$ fills up to the packers 36 the pressure of subsequently inflowing cement forcing the valves $7^a$ open so that the bore becomes filled as shown. The injector tubing 25 is withdrawn while the cement inside the casing is yet plastic. The cement inside the casing may be removed by suitable means, but that outside of the casing remains in place.

I claim:

1. Means for sealing a well before opening the bore into a productive stratum, comprising a well casing with a plurality of valved ports; and tubing let down in the casing, with packing means for securing a joint therebetween and the casing, having perforations through which sealing material is ejected to fill the casing up to the packing means, and then escape through said ports to fill the surrounding bore.

2. Means for sealing a well before opening the bore into a productive stratum, comprising a well casing composed of sections and including a ported cementing shoe; tubing let down in the casing, having openings through which sealing material is ejected into the casing; and valves controlling the ports, enabling the material to flow out of the casing into the bore but not back.

3. The method of sealing a well consisting of lowering a casing with an opening into the bore of a well and resting it permanently on the formation seat, inserting a cement injector into the casing until it strikes the bottom of the bore, introducing cement by said injector into the inside of the casing until it reaches and flows through the opening and into the bore, withdrawing the injector while the cement is yet plastic, and preventing the return of the cement from the bore through said opening.

4. The method of sealing a well consisting of lowering a casing with an opening into the bore of a well and resting it permanently on the formation seat, inserting a perforated cement injector into the casing until it too rests on the formation seat, introducing cement into said injector causing it to flow out of said perforation into the casing thence through the opening and into the bore, withdrawing the injector while the cement is yet plastic, and preventing the return of the cement from the bore through said opening.

5. Well cementing means comprising casing having normally closed ports adapted to be opened by pressure of material in the casing for discharge of said material outwardly through said ports, and means below the ports for closing the space between the bore of a well and the space outside of the casing.

6. Well cementing means comprising casing having normally closed ports adapted to be opened by pressure of material in the casing, and means below said ports for closing communication between the bore of the casing and the space outside of the casing.

7. Well cementing means comprising a cementing barrel forming a fixed section of well casing and having ports adapted for discharge of material into the space between the casing and the bore of a well, check valves controlling said ports, and means below said ports for closing communication between said space and the bore of the casing.

8. A well casing including a ported fixed section having normally closed ports, automatic valve means controlling said ports enabling introduction of sealing material through said section into the space between the casing and a well bore and preventing back flow thereof.

9. A device of the character described comprising a fixed section of well casing arranged for coupling to a string of well casing, said section having peripheral ports, and valve means normally closing said ports and operated by pressure of fluent sealing material in said section to open the latter to permit outward passage of said material.

10. A device of the character described comprising a fixed section of well casing arranged for coupling to a string of well casing, said section having peripheral ports, and outwardly opening check valves controlling said ports.

11. In combination with a string of well casing, a fixed section coupled thereto to form a portion of said string, said section having peripheral ports, and valve means normally closing said ports and operated by pressure of fluent material in said section to open the latter to permit outward passage of said material.

12. In combination with a string of well casing, a fixed section coupled thereto to form a portion of said string, said section having peripheral ports, and outwardly opening check valves controlling said ports.

13. In combination with a well casing disposed in a well bore, of means for creating a surrounding barrier between the well casing and the bore at a desired point, comprising a valve structure disposed at a point along the length of the shaft, said valve structure having a port communicating with the exterior of the casing, and a check valve acting to permit the cementitious material to be forced outwardly from the casing through the port.

14. In combination with a string of casing disposed within a well bore. means forming a fixed section of the string for creating a surrounding barrier between the casing and the bore comprising a valve structure to be interposed between lengths of casing to permit cementitious material to be forced from within the casing to the space within the bore surrounding the casing and including automatic valve means for preventing the backflow of the cementitious material into the casing.

Signed at Los Angeles, in the county of Los Angeles, this 15th day of June, 1926.

ERD V. CROWELL.